United States Patent [19]

Elsbett et al.

[11] 4,015,577
[45] Apr. 5, 1977

[54] RECIPROCABLE PISTON INTERNAL COMBUSTION ENGINE, ESPECIALLY DIESEL ENGINE

[76] Inventors: Ludwig Elsbett; Gunter Elsbett, both of Industriestrasse 14, D 8543 Hilpoltstein, Germany

[22] Filed: Aug. 22, 1973

[21] Appl. No.: 390,493

[30] Foreign Application Priority Data

Aug. 23, 1972 Germany .......................... 2241355

[52] U.S. Cl. ..................... 123/188 M; 123/188 VA; 123/30 C; 123/32 ST
[51] Int. Cl.[2] ........................................... F01L 3/00
[58] Field of Search ............ 123/30.2, 32 SP, 32 A, 123/32 ST, 188 M, 188 VA, 30 C

[56] References Cited

UNITED STATES PATENTS

| | | | |
|---|---|---|---|
| 2,014,828 | 9/1935 | Wirrer | 123/32 A |
| 2,504,036 | 4/1950 | Morrison | 123/32.1 |
| 2,606,538 | 8/1952 | Malin | 123/30.2 |
| 2,718,883 | 9/1955 | Taylor | 123/30.2 |
| 2,920,613 | 1/1960 | Vogel et al. | 123/188 M |
| 3,035,558 | 5/1962 | Wiebicke et al. | 123/188 M |
| 3,154,059 | 10/1964 | Witzky et al. | 123/188 M |
| 3,315,650 | 4/1967 | Bishop et al. | 123/30.2 |
| 3,868,940 | 3/1975 | Kirchweger | 123/30 C |

FOREIGN PATENTS OR APPLICATIONS 1,194,199   6/1965   Germany .......................... 123/32 C

*Primary Examiner*—Wendell E. Burns
*Assistant Examiner*—James D. Liles
*Attorney, Agent, or Firm*—Walter Becker

[57] ABSTRACT

A reciprocable piston internal combustion engine, especially diesel engine, with an air guiding passage leading to a combustion chamber for combustion air to be conveyed by the air feeding passage. The air feeding passage is provided with twist-forming elements. Also means are provided for controlling air injection and are actuated dependent upon load or smoke with the opening cross section of the air feeding passage being variable within predetermined limits. The oxygen supply is kept low during the combustion of the air with the fuel in the center of the combustion chamber during all load ranges of the internal combustion engine. Combustion air which is rich in oxygen and stays close to the wall of the combustion chamber is affected by the radially progressing combustion only when the temperature in the combustion chamber or cylinder starts dropping in view of the expansion of the air-fuel mixture.

5 Claims, 3 Drawing Figures

RECIPROCABLE PISTON INTERNAL COMBUSTION ENGINE, ESPECIALLY DIESEL ENGINE

The present invention relates to a reciprocable piston internal combustion engine, especially diesel engine, with air feeding passage means leading to a cylinder and an internal combustion engine for feeding combustion air while the air feeding passage has twist-forming elements. The opening cross section of the air conveying passage means is variable within predetermined limits. Furthermore, the combustion air rotates about the axis of the combustion chamber while the twist picture initiated by the twist-forming elements is retained. The fuel is injected into the rotating air turbulence during a predetermined injection period.

With reciprocable piston internal combustion engines such as diesel engines, it has been realized for a considerable time that the increase in the output of the internal combustion engine on one hand and the reduction in the non-burned fuel-air components on the other hand is a function of the air flow in the combustion chamber as well as of the degree of exploitation of the air, in other words of the so-called degree of delivery in the respective present combustion air with regard to the respective fuel present. In order properly to take into consideration this finding, internal combustion engines are on one hand equipped with twist-forming elements, especially at their intake passages, and on the other hand are equipped with air chargers, so-called turbo charges etc. In spite of these auxiliary means, it has not been possible in some instances to increase the output of an internal combustion engine over all load ranges, because these auxiliary means are as a rule designed at an optimum only for customary load ranges whereas varying load ranges are not mastered by said auxiliary means.

However, in order also to take into consideration a portion of the varying load ranges, it is known in connection with an internal combustion engine to provide additional guiding means in the form of guiding blades in the air feeding passage provided in the cylinder head of such internal combustion engine, in this instance the inlet passage, while said guiding blades are preferably made adjustable. The guiding blades which in such an instance are designed as bi-metal springs, are able during varying of load conditions over the change in temperature at the passage walls to vary their position so that a more or less wider cross section of the air feeding passage is freed. Regardless of the fact that temperature conditions in an internal combustion engine, especially in a diesel engine, which is subjected to frequent changes in load do not change so fast, such guiding blades are likewise able to cover only some definite load ranges in predetermined time periods. Thus, with such controlled guiding blade it is not possible to obtain the desired optimum output in all load ranges.

Accordingly, it is an object of the present invention so to improve the course of combustion of a reciprocable piston internal combustion engine that while maintaining as far as possible the twist picture adapted to the respective shape of the combustion chamber, and while maintaining a high degree of delivery of combustion air, there will in all regions of load be obtained a reduction in the harmful combustion residues while the combustion of the fuel will occur with the available combustion air in conformity with the controlled oxygen supply.

This object and other objects and advantages of the invention will appear more clearly from the following specification in connection with the accompanying drawing, in which:

FIG. 1 diagrammatically illustrates a longitudinal central section through a piston with a combustion chamber provided therein and being rotation symmetric.

Figure 1:
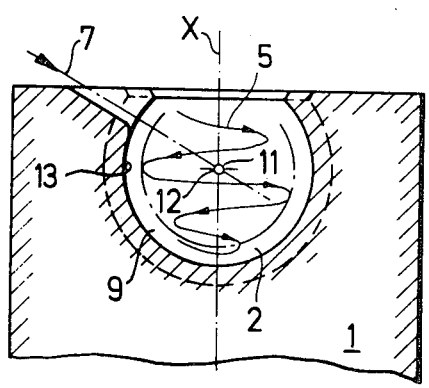

The reciprocable internal combustion engine according to the present invention is characterized primarily in that in addition to a strong definition of the twist of the combustion air in the combustion chamber, the supply of oxygen during the combustion of the air with the fuel in the center of the combustion chamber is kept low in all load ranges of the internal combustion engine, and is furthermore characterized in that the combustion air which stays at the combustion chamber wall and is rich in oxygen will be the radially progressive combustion be called upon by the combustion process only when the temperature in the combustion chamber and cylinder begins to drop in view of expansion.

In view of these steps, the problem underlying the present invention is not only advantageously realized but in addition thereto a good output of the internal combustion engine and a considerable improvement in the waste gases is obtained in particular with regard to nitrogen oxide components ($NO_x$). This is due to the fact that in view of the timely previous withdrawal of the oxygen of the air from the nitrogen oxide compound (NO) a reduced nitrogen oxide concentration occurs. With the improvement of the twist in conformity with the invention, also the so-called be-value or median effective pressure is improved. As a result thereof, in order to obtain good waste gas results, it is not necessary to give up the diesel engine with direct injection of the fuel into the combustion chamber, which has proved highly satisfactory in the meantime.

A further development of the invention is characterized in that the twist of the combustion air in the combustion chamber is so increased that by means of a combustion front occurring at the fuel jet, a separation occurs in a hot burned inner air turbulence and a cold still unburned outer air turbulence. Furthermore, a further feature according to the invention consists in that the fuel is so injected in the direction of the rotating air turbulence that its jet is tangent to the gravity circle or circular middle point of the air turbulence, and the tangent point is located in the vertical projection of the combustion chamber on the same horizontal axis as the center of gravity of the combustion chamber.

In order to impart a high speed upon the combustion air surrounding the combustion chamber, and thus to impart a high twist, it is suggested according to a further feature of the invention to provide a guiding blade in the air feeding passage which guiding blade extends to the valve guiding means of the inlet valve. These guiding blades may according to a preferred embodiment of the invention be adapted to the shape of the air feeding passage and may also be pivotable about an axis.

The employment of such guiding blade in the air feeding passage, in the present case in the inlet passage of an internal combustion engine, has the advantage that the cross section of the passage can from an optimum position be varied in a continuous manner so that with the guiding blade correspondingly set, that end thereof which faces toward the guiding means for the valve forms nozzle-shaped openings through which the combustion air is at high speed conveyed into the combustion chamber and cylinder chamber.

In order to make sure that the guiding blades can adapt themselves to the continuously varying load ranges, it is possible to control said guiding blade in conformity with the load of the internal combustion engine or the development of smoke thereof.

These two control types of the guide blade permit a continuous adaptation of the guide blade to the continuously varying air conditions so that a combustion of the fuel can with the combustion air be effected in an optimum manner in all load ranges.

Referring now to the drawing in detail, the drawing shows portions only of an internal combustion engine. More specifically, the piston 1 is provided with a combustion chamber 2 while of the cylinder head 3 there is shown only an air feeding passage — the inlet passage 4 — for combustion air 5. The combustion air 5 which is to be conveyed to the combustion chamber 2 passes into the latter through the inlet passage 4 at a particularly high twist. In order to impart upon the combustion air 5 to be conveyed into the combustion chamber 2 the desired high twist about the cylinder and combustion chamber axis x, twist-forming elements 6 are provided in the inlet passage 4 so that the air which passes by said elements 6 will be forced to circulate about the axis of the combustion chamber.

Figure 2:
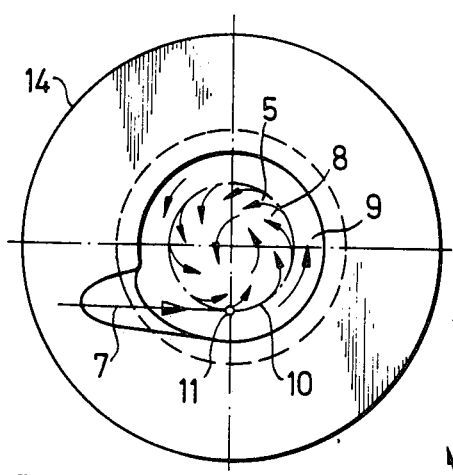
FIG. 2 is a top view of the piston and the combustion chamber illustrated in FIG. 1.

Numerous tests have shown that for an optimum combustion of the combustion air 5 conveyed to the combustion chamber 2 with a fuel 7 injected into the combustion chamber, it is important that only that much fuel is bonded to the prevailing combustion air as is necessary for the combustion of said fuel while excluding or avoiding poisonous discharges and soot. In this connection, it is to be noted that for purposes of excluding combustion residues for instance in the form of carbon monoxide compounds (CO), a good intermixture of the fuel 7 with sufficient combustion air 5 is necessary. For purposes of excluding hydrocarbon compounds (CH), lack of oxygen must be avoided. On the other hand, for purposes of avoiding nitrogen oxide compounds ($NO_x$), high temperatures must be excluded while having an excess of oxygen, and also the formation of soot must be prevented when fuel 7 is bonded to non-burned combustion air 5. While maintaining these findings known per se, the course of combustion is to be so controlled that with an effective intermixture of fuel 7 and combustion air 5, the combustion will occur at relatively high temperatures but without a high supply of oxygen. To this end, and in conformity with the present invention, the combustion air 5, which rotates in the combustion chamber 2 about the axis x of the combustion chamber, is by means of the fuel 7 injected into the combustion chamber divided into an outer and an inner air whirl 8, 9 respectively. The inner air whirl or turbulence 8 is located within a gravity circle 10, whereas the outer air whirl 9 is located outside said gravity circle. The gravity circle 10 the position of which is determined by the range of different specific gravity of the combustion air 5 also determines the plane into which the fuel 7 is injected into the fuel chamber 2. In this connection, the jet of the fuel 7 contacts the gravity circle 10 at a so-called point of tangency 11. The position of this point 11 is obtained from its vertical projection in such a way that this point of tangency is located preferably in a horizontal axis which extends through the center point 12 of the fuel chamber 2. The division of the rotating air whirls 8, 9 into an outer and an inner air whirl, which division is effected by the jet of the fuel 7, starts in view of the combustion and more specifically in such a way that at the start of the combustion the burning mixture will in view of the change in the specific gravity flow toward the center point 12 of the combustion chamber 2, in other words, inwardly, whereas the still cold heavy air whirl 9 rotates outside the gravity circle 10 along the wall 13 of the combustion chamber (FIGS. 1 and 2). By the combustion operation, oxygen is withdrawn from the burning fuel-air mixture so that the combustion within the gravity circle 10 occurs with a certain lack of oxygen as a result of which a nitrogen oxide compound cannot be formed. Inasmuch as also the temperatures will after effected combustion of the fuel-air mixture drop within the gravity circle 10 and since these temperatures, even with progressing intermixture of the burned fuel-air components with the colder combustion air 5 rotating outside the gravity circle will drop further, the combustion of the outer air whirl 9 will occur at lower temperatures, which fact likewise prevents the formation of in particular nitrogen oxide compounds. The outer air whirl 9 which rotates outside the gravity circle 10 is affected by the radially expanding combustion of the fire core from the center point 12 of the combustion chamber 2 only when the expansion in the cylinder 14 and combustion chamber has started, so that an increase in temperature will be prevented. In this way, the outer air whirl 9 will burn at a lower temperature which is still so low that it will no longer be sufficient for the formation of nitrogen oxide compounds.

Figure 3:
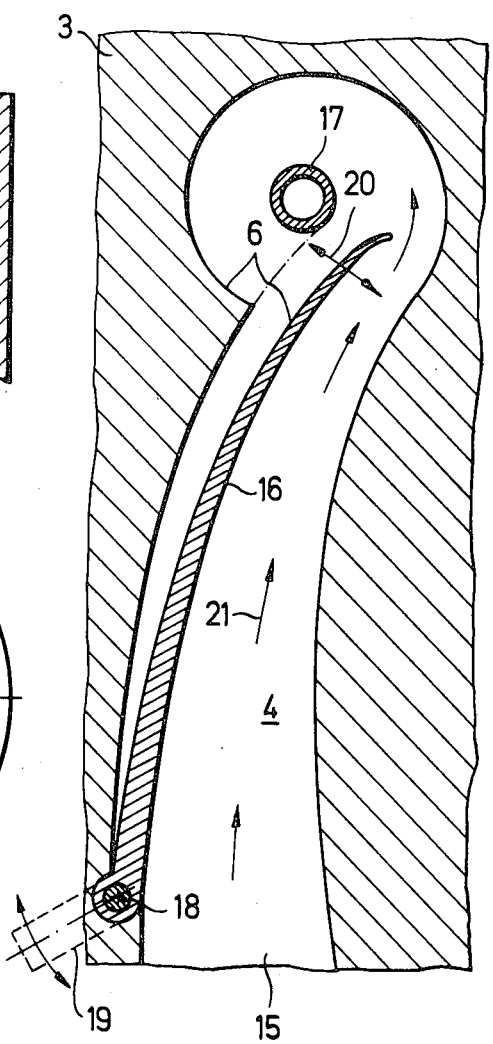
FIG. 3 is a section through an air feeding passage with a guiding blade pivotally mounted in said air feeding passage.

One possibility of generating the high twist of the combustion air 5 in order by the subsequently effected separation of the air whirls 8 and 9 to prevent the generation of in particular nitrogen oxide and its compounds, exists in guiding the air into the inlet passage 4 in a variable manner. The inlet passage 4, which is provided in the cylinder head 3 of the internal combustion engine, has a preferably curved shape and may extend from an intake conduit 15 to a valve opening which leads into the cylinder 14 but is not shown in the drawing. In this inlet passage 4 there is provided a guiding surface 16 for the combustion air 5 to be introduced into the cylinder 14. The guiding surface 16 is arranged in the inlet passage either in a rigid or pivotal manner. This guiding surface 16 which extends to a valve guiding means 17 may be pivoted about a pivot 18 in the inlet passage 4 in such a way that in conformity with the load or the smoke development of the internal combustion engine, a more or less wide passage cross section will be freed. In order to increase this twist of the combustion air 5 entering the combustion chamber 2, the free end of the guiding surface 16 may, depending on the requirements, be slightly curved out of the remaining plane of the guiding surface toward the valve guiding means 17 or away therefrom as has been illustrated by way of example in FIG. 3. The guiding surface 16 itself may be means of a separate linkage system 19 be pivoted about the pivot 18 in the direction of the double arrow 20 in such a way that the combustion air 5 will enter the cylinder 14 in the direction of the arrows 21. The actuation of the linkage system 19 and thereby of the guiding surface 16 may be effected in conformity with the smoke development or in conformity with the respectively developed power.

It is, of course, to be understood that the present invention is, by no means, limited to the specific showing in the drawing but also comprises any modification within the scope of the appended claims.

What we claim is:

1. A reciprocable piston internal combustion engine, especially diesel engine having smoke development therewith, which includes in combination: a cylinder, a piston reciprocable in said cylinder and provided with a combustion chamber therein for receiving fuel and air for combustion, a cylinder head associated with said cylinder and comprising recess means aligned with said combustion chamber, said cylinder head also being provided with air conveying passage means leading into said recess means, valve guiding means arranged in said recess means, valve means guided in said valve guiding means for continuously controlling change in the supply of air from said recess means to said combustion chamber, and air guiding means simultaneously movably arranged within said air conveying passage means and including a movable vane pivoted at a point remote from said recess means with a free end extending toward said valve guiding means so that said free end overlies said recess means, said free end being movable to restrict the passage of air into said chamber and vary the velocity of circulating air, thereby subjecting the fuel-air mixture in the combustion chamber to a strongly defined twist during all load ranges of the internal combustion engine keeping relatively low the supply of oxygen to the combusting the fuel-air mixture in the center of the combustion chamber.

2. An internal combustion engine in combination according to claim 1, which includes guide surface means always responsive to the load of the internal combustion engine and operatively connected to said air guiding means so that the air guiding means is pivotable about said pivot means in conformity with the load of the internal combustion engine at all times.

3. An internal combustion engine in combination according to claim 2, which includes guide surface means responsive to smoke development of said internal combustion engine and operatively connected to said air guiding means to cause the latter to pivot about said pivot means in conformity with the smoke development of said internal combustion engine.

4. An internal combustion engine in combination according to claim 2, in which the free end of said air guiding means in the vicinity of said valve guiding means is bent out of the plane of the remaining portion of said air guiding means.

5. An internal combustion engine in combination according to claim 4, in which said free end of said air guiding means is bent to extend away from said valve guiding means.

* * * * *